US010191605B2

(12) United States Patent
Wang et al.

(10) Patent No.: US 10,191,605 B2
(45) Date of Patent: Jan. 29, 2019

(54) TOUCH PANEL, DRIVING METHOD THEREOF, AND DISPLAY DEVICE BASED ON ELECTROMAGNETIC INDUCTION

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Pengpeng Wang, Beijing (CN); Xue Dong, Beijing (CN); Hailin Xue, Beijing (CN); Xiaochuan Chen, Beijing (CN); Haisheng Wang, Beijing (CN); Shengji Yang, Beijing (CN); Yingming Liu, Beijing (CN); Xiaoliang Ding, Beijing (CN); Weijie Zhao, Beijing (CN); Hongjuan Liu, Beijing (CN); Changfeng Li, Beijing (CN); Wei Liu, Beijing (CN); Jian Gao, Beijing (CN); Xiaochen Niu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/737,206
(22) PCT Filed: Mar. 23, 2017
(86) PCT No.: PCT/CN2017/077882
§ 371 (c)(1),
(2) Date: Dec. 15, 2017
(87) PCT Pub. No.: WO2017/190562
PCT Pub. Date: Nov. 9, 2017

(65) Prior Publication Data
US 2018/0164920 A1    Jun. 14, 2018

(30) Foreign Application Priority Data
May 6, 2016 (CN) .......................... 2016 1 0296804

(51) Int. Cl.
G06F 3/046 (2006.01)
G06F 3/041 (2006.01)

(52) U.S. Cl.
CPC ............ G06F 3/046 (2013.01); G06F 3/0414 (2013.01); G06F 3/0416 (2013.01); G06F 3/0412 (2013.01); G06F 2203/04107 (2013.01)

(58) Field of Classification Search
CPC ...... G06F 3/044; G06F 3/0416; G06F 3/0414; G06F 2203/04107; G06F 2203/04111; G06F 3/03545
See application file for complete search history.

(56) References Cited

U.S. PATENT DOCUMENTS

2011/0285454 A1    11/2011    Bayramoglu
2016/0109988 A1     4/2016    Wang et al.
2016/0342246 A1    11/2016    Xu

FOREIGN PATENT DOCUMENTS

CN    102253787    11/2011
CN    103927070     7/2014
(Continued)

OTHER PUBLICATIONS

Boe Technology Group Co., Ltd., et al., "International Search Report" for Chinese PCT Application No. PCT/CN2017/077882, dated Jun. 28, 2017.
(Continued)

Primary Examiner — Premal R Patel
(74) Attorney, Agent, or Firm — Womble Bond Dickinson (US) LLP

(57) ABSTRACT

An embodiment of this disclosure discloses a touch panel. The touch panel comprises a first substrate and a second substrate opposite to the first substrate. The touch panel further comprises a plurality of magnetic protrusions arranged on the first substrate and protruding towards the second substrate. The touch panel further comprises a first (Continued)

coil group and a second coil group, the first coil group comprises a plurality of coils extending in a first direction, and the second coil group comprises a plurality of coils extending in a second direction. The first coil group and the second coil group are stacked on the second substrate and insulated from each other. The coils of the first and second coil group and corresponding magnetic protrusions constitute a plurality of inductive sensors.

20 Claims, 7 Drawing Sheets

(56) References Cited

FOREIGN PATENT DOCUMENTS

| CN | 104182112 | 12/2014 |
|---|---|---|
| CN | 104484086 | 4/2015 |
| CN | 105739806 | 7/2016 |
| CN | 205608704 | 9/2016 |
| CN | 205608704 U | 9/2016 |
| JP | 2005004274 | 1/2005 |

OTHER PUBLICATIONS

"First office action," CN Application No. 201610296804.X (dated Mar. 29, 2018).

TOUCH PANEL, DRIVING METHOD THEREOF, AND DISPLAY DEVICE BASED ON ELECTROMAGNETIC INDUCTION

CROSS REFERENCE TO RELATED APPLICATIONS

The present application is the U.S. national phase entry of PCT/CN2017/077882, with an international filing date of Mar. 23, 2017, which claims the priority and benefits of Chinese patent application No. 201610296804.X filed on May 6, 2016, the disclosure of which is incorporated herein by reference.

TECHNICAL FIELD

This disclosure relates to the field of touch display and control, and in particular, to an inductive touch panel, a driving method thereof, and a related display device.

BACKGROUND

Nowadays, touch panels have been widely applied in displays of various electronic devices, such as smart phones, tablet computers, personal digital assistants (PDA), digital cameras, e-book readers and wearable electronic devices. According to the medium used, touch panels are usually categorized into a resistive type, a capacitive sensing type (a capacitive type), an electromagnetic induction type (an inductive type), an infrared type, a surface acoustic wave type and so on.

An existing inductive touch panel generally uses a rectangular coil to receive signals from a dedicated stylus, so as to generate electromagnetic induction signals.

However, such an inductive touch panel can only sense signals having a higher frequency, e.g., sent by the stylus. If it is touched directly by a human finger, the coil may not sense the touch signals since the finger has lower permeability. Accordingly, touch control cannot be achieved.

SUMMARY

In view of this, embodiments of this disclosure provide a touch panel, a method for driving the touch panel and a display device that are capable of achieving pressure touch control based on electromagnetic induction.

According to a first aspect of this disclosure, a touch panel is provided. The touch panel comprises a first substrate, a second substrate opposite to the first substrate, a plurality of magnetic protrusions arranged on the first substrate and protruding towards the second substrate, a first coil group comprising a plurality of coils extending in a first direction, and a second coil group comprising a plurality of coils extending in a second direction. In the touch panel, the first coil group and the second coil group are stacked on the second substrate and insulated from each other. Further, the coils of the first and second coil group and the corresponding magnetic protrusions constitute a plurality of inductive sensors, the inductive sensors being capable of generating inductance variations responsive to variations in distances between the coils and the corresponding magnetic protrusions.

In an embodiment of this disclosure, the plurality of magnetic protrusions can be arranged in a light-shielding region of the first substrate, and the coils of the first coil group and the coils of the second coil group can be arranged in a light-shielding region of the second substrate.

In an embodiment of this disclosure, an insulating layer is arranged between the first coil group and the second coil group.

In an embodiment of this disclosure, the first direction is substantially perpendicular to the second direction.

In an embodiment of this disclosure, each coil of the first coil group and the second coil group may surround orthographic projections of at least one of the plurality of magnetic protrusions on the second substrate.

In an embodiment of this disclosure, each coil of the first coil group and the second coil group can surround one or more pixel units.

In an embodiment of this disclosure, an overlapping region of each coil of the first coil group and each coil of the second coil group may surround one or more pixel units.

In an embodiment of this disclosure, an overlapping region of each coil of the first coil group and each coil of the second coil group may surround orthographic projections of at least one of the plurality of magnetic protrusions on the second substrate.

In an embodiment of this disclosure, the touch panel can further comprise a plurality of inductance variation detectors connected with the coils of the first coil group and the second coil group respectively and configured to detect the inductance variations of the plurality of inductive sensors.

In an embodiment of this disclosure, the inductance variation detector is further configured to determine a position of the coil connected therewith upon detection of the inductance variations.

In an embodiment of this disclosure, the touch panel can further comprise a position detector and a pressure detector. The position detector is configured to determine a touch position of a touch object causing the inductance variations based on the position of the coil received from the inductance variation detector. The pressure detector is configured to calculate variations in the distances between the coils and the corresponding magnetic protrusions based on the inductance variations received from the inductance variation detectors, and calculate a touch pressure value based on the variations in the distances.

In an embodiment of this disclosure, the plurality of magnetic protrusions can be made of an opaque magnetic material. In this case, the plurality of magnetic protrusions can be arranged in the light-shielding region of the first substrate.

In an embodiment of this disclosure, the opaque magnetic material comprises one of a ferrite material and an iron-nickel alloy material.

In an embodiment of this disclosure, the plurality of magnetic protrusions can be made of a transparent magnetic material. In this case, the plurality of magnetic protrusions can be arranged in a display region of the first substrate.

In an embodiment of this disclosure, the transparent magnetic material may comprise magnetic metal particles and silicon dioxide aerosols.

In an embodiment of this disclosure, the magnetic protrusion may have a structure selected from a group consisting of a pyramid, a cylinder and a frustum.

In an embodiment of this disclosure, the touch panel can be a liquid crystal display panel. The first substrate is a color film substrate, and the second substrate is a thin film transistor array substrate, vice versa.

In an embodiment of this disclosure, the plurality of magnetic protrusions can be arranged in a black matrix region between color filters of the color film substrate, and the first coil group and the second coil group can be arranged in a black matrix region between pixel units of the thin film transistor array substrate.

In an embodiment of this disclosure, a plurality of through holes may be arranged in a common electrode of the thin film transistor array substrate at positions corresponding to the plurality of magnetic protrusions.

In an embodiment of this disclosure, a plurality of openings may be arranged in the thin film transistor array substrate at positions corresponding to the plurality of magnetic protrusions.

In an embodiment of this disclosure, the touch panel is an organic light-emitting diode display panel. The first substrate is an encapsulation substrate, and the second substrate is an OLED array substrate, vice versa.

In an embodiment of this disclosure, the plurality of magnetic protrusions can be arranged in a region of the encapsulation substrate corresponding to a gap region between pixel units of the OLED array substrate, and the first coil group and the second coil group can be arranged in the gap region between the pixel units of the OLED array substrate.

In an embodiment of this disclosure, the cathode of the organic light emitting diode can be split in the gap region between the pixel units of the OLED array substrate.

According to a second aspect of this disclosure, a method for driving the touch panel described above is provided. For this method, during a first period of time, the pixel units of the touch panel are controlled to display images and no AC voltage is applied to the first coil group and the second coil group. During a second period of time, the pixel units are controlled not to display images and an AC voltage is applied to the first coil group and the second coil group.

In an embodiment of this disclosure, during the second period of time, inductance variations of the plurality of inductive sensors in the touch panel are detected.

In an embodiment of this disclosure, responsive to the detection of inductance variations of at least two inductive sensors, positions of the coils of the at least two inductive sensors are determined.

In an embodiment of this disclosure, a touch position of a touch object causing the inductance variations is determined based on the positions of the coils, and variations in the distances between the coils and the corresponding magnetic protrusions are calculated based on the detected inductance variations, and a touch pressure value is determined based on the variations in the distances.

According to a third aspect of this disclosure, a display device comprising the touch panel as described above is provided.

BRIEF DESCRIPTION OF DRAWINGS

In order to render the technical solutions of the embodiments of this disclosure clearer, drawings of the embodiments will be described below briefly. It should be understood that the drawings described below only relate to some embodiments of this disclosure, instead of limiting this disclosure, wherein.

DETAILED DESCRIPTION OF EMBODIMENTS

In order to render the objective, technical solutions and advantages of the embodiments in this disclosure clearer, the technical solutions of the embodiments of this disclosure will be described clearly and completely as follows with reference to the drawings. Apparently, the embodiments described below are only part of the embodiments of the invention, rather than all of them. Based on the described embodiments of this disclosure, all other embodiments obtainable by the skilled in the art without any inventive efforts shall fall within the protection scope of the invention.

Figure 1:
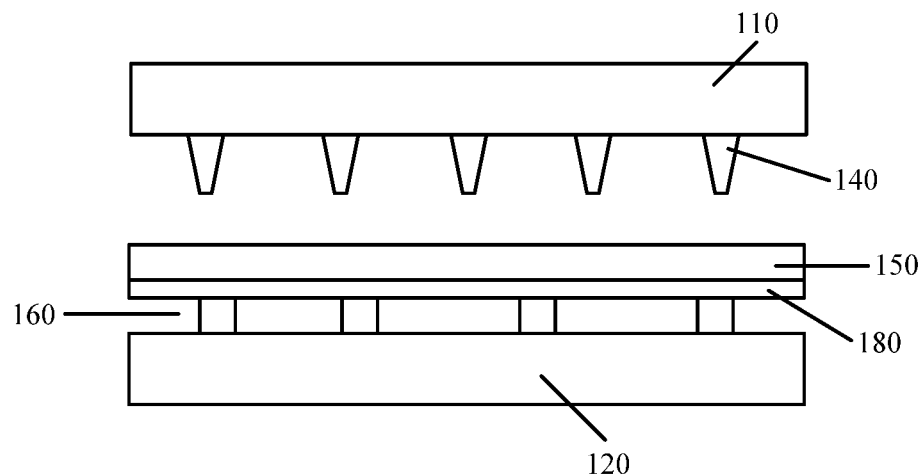
FIG. 1 is a schematic view of the touch panel according to a first embodiment of this disclosure.

FIG. 1 shows a schematic section view of a touch panel 100 according to a first embodiment of this disclosure. As shown in FIG. 1, the touch panel 100 comprises a first substrate 110 and a second substrate 120 opposite to the first substrate 110. Furthermore, the touch panel 100 comprises a plurality of magnetic protrusions 140. The magnetic protrusions 140 are attached to the first substrate 110 and protrude towards the second substrate 120. Besides, the touch panel 100 further comprises a first coil group 150 and a second coil group 160. The first coil group 150 comprises a plurality of coils extending in a first direction, and the second coil group 160 comprises a plurality of coils extending in a second direction different from the first direction. The first coil group 150 and the second coil group 160 are stacked above the second substrate 120 and insulated from each other.

Thus, the coils of the first coil group 150, the coils of the second coil group 160 and corresponding magnetic protrusions 140 may constitute a plurality of inductive sensors. Each of the inductive sensors is capable of generating an inductance variation responsive to a variation in the distance between the coil thereof and a corresponding magnetic protrusion. In this way, when the touch panel 100 is pressed by a touch object (e.g., a human finger), the first substrate 110 deforms such that the magnetic protrusions 140 at a pressed position (or in the vicinity thereof) move downwards. The variation in the distance between the magnetic protrusion 140 and the corresponding coil cause the inductive sensors to generate the inductance variation.

In an embodiment of this disclosure, in order to prevent the magnetic protrusions 140, the first coil group 150 and the second coil group 160 from blocking the images to be displayed, the magnetic protrusions 140 can be arranged in a light-shielding region of the first substrate 110, and the first coil group 150 and the second coil group 160 can be arranged in a light-shielding region of the second substrate 120.

In an embodiment of this disclosure, the magnetic protrusions 140 can be made of an opaque magnetic material, for example a material having a high permeability such as ferrite or permalloy (i.e., an iron-nickel alloy). In this case, the magnetic protrusions 140 are arranged in the light-shielding region of the first substrate 110. In other embodiments of this disclosure, the magnetic protrusions 140 can be made of a transparent magnetic material, for example a material consisting of silicon dioxide aerosols and magnetic metal particles such as neodymium, ferrum and boron. In this case, the magnetic protrusions 140 can also be arranged in a display region of the first substrate 110, thereby increasing the possible number of the magnetic protrusions 140. Besides, the magnetic protrusion 140 can be formed as various structures such as a pyramid, a cylinder or a frustum.

In an embodiment of this disclosure, an insulating layer 180 can be arranged between the first coil group 150 and the second coil group 160 such that the first coil group 150 and the second coil group 160 are insulated from each other. Further, in an embodiment of this disclosure, the first direction and the second direction can be substantially substantially perpendicular to each other.

Figure 2:
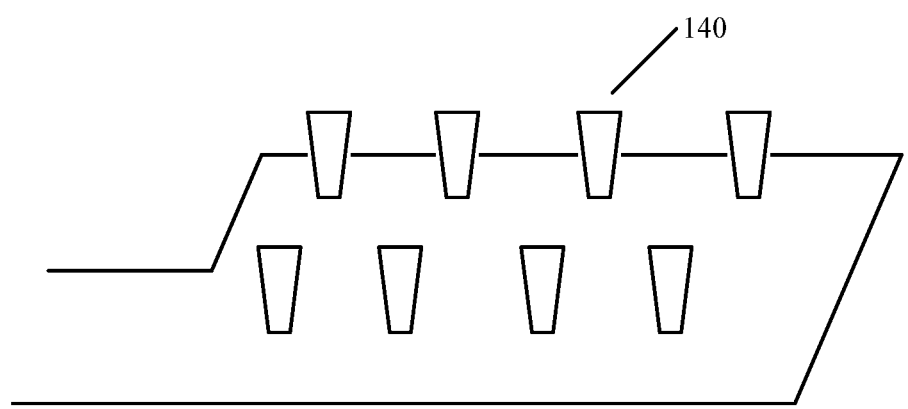
FIG. 2 is a schematic view illustrating the structure of the inductive sensors.

FIG. 2 schematically shows a structure of an inductive sensor in the touch panel 100 of FIG. 1. As shown in FIG. 2, the inductive sensor can comprise a coil and one or more magnetic protrusions 140, and orthographic projections of the one or more magnetic protrusions 140 on the second substrate 120 falls within the coil. In the inductive sensor, the magnetic protrusions 140 are used as a magnetic core. By disposing multiple magnetic protrusions 140 in the inductive sensor, the inductance of the inductive sensor can be increased, which is advantageous to inductance detection.

Besides, in an embodiment of this disclosure, each coil may surround one or more pixel units. By changing the number of the pixel units surrounded by the coil, the accuracy in pressure touch control for the touch panel can be adjusted.

Figure 3:
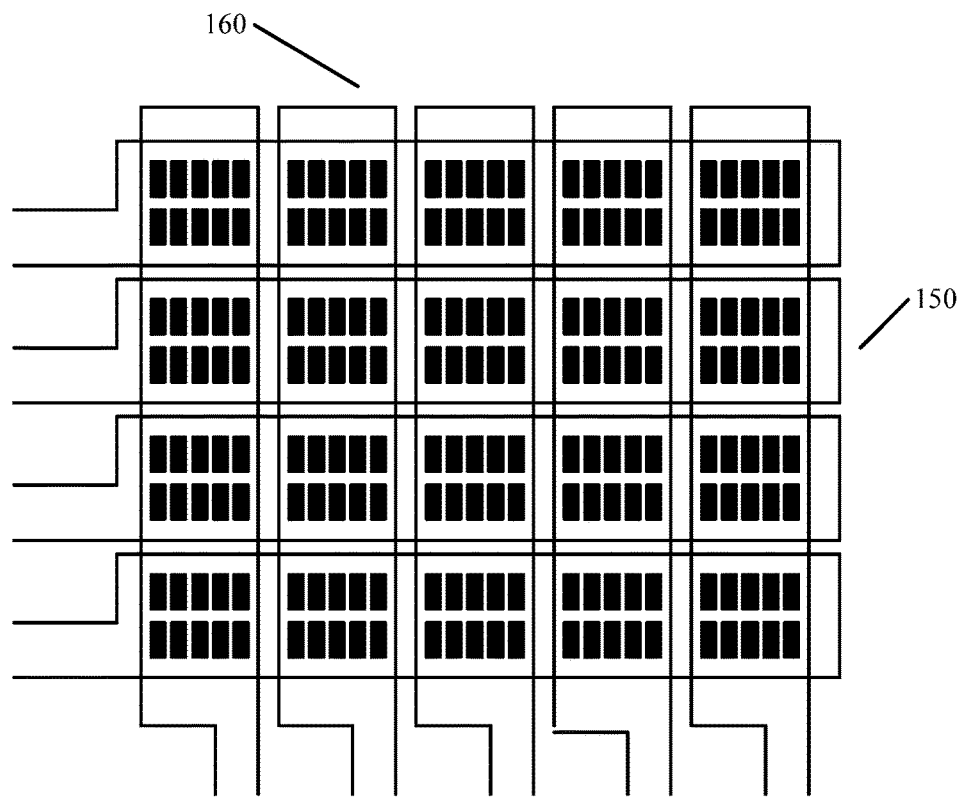
FIG. 3 is a schematic view showing the positional relationship between the two coil groups in the touch panel according to an embodiment of this disclosure.

FIG. 3 schematically shows an example illustrating the positional relationship between the first coil group 150 and the second coil group 160. In this example, the coils in the first coil group 150 and the second coil group 160 are all rectangular coils. As should be understood by one skilled in the art, coils having other shapes are also possible.

As shown in FIG. 3, the plurality of rectangular coils in the first coil group 150 are arranged in parallel in a horizontal direction, and the plurality of rectangular coils in the second coil group 160 are arranged in parallel in a vertical direction. In this way, coils of the first coil group 150 and coils of the second coil group 160 can overlap each other to form a plurality of rectangular lattices (i.e., an overlapping region), and each rectangular lattice can surround one or more pixel units. Also, each rectangular lattice can surround orthographic projections of one or more magnetic protrusions on the second substrate.

The touch panel according to the embodiments of this disclosure can operate alternatingly in a display mode and in a touch mode, which can be achieved by time-division multiplexing techniques. In the display mode, the touch panel enables a display function. In the touch mode, the touch panel disables the display function. When the touch panel is pressed by a human finger, the first substrate 110 will deform such that corresponding magnetic protrusions 140 on the first substrate 110 move downwards. In this way, the distance between the magnetic protrusions 140 and corresponding coils is shortened such that the inductances of the corresponding inductive sensors change. Based on variations in the inductances of the inductive sensors, a pressing position and a touch pressure value can be determined (specific details will be provided below), and thereby pressure touch control can be achieved.

As can be seen from the above depictions, by forming a plurality of inductive sensors inside the touch panel 100, the touch panel 100 according to the embodiments of this disclosure can achieve pressure touch control. Besides, since the magnetic protrusions can be made of a material having a high permeability (for example, a ferrite material), inductance variations brought by subtle variations in the distance mentioned above can be detected, which can achieve pressure touch control with high accuracy.

The touch panel according to an embodiment of this disclosure will be illustrated as follows through specific examples.

Figure 4:
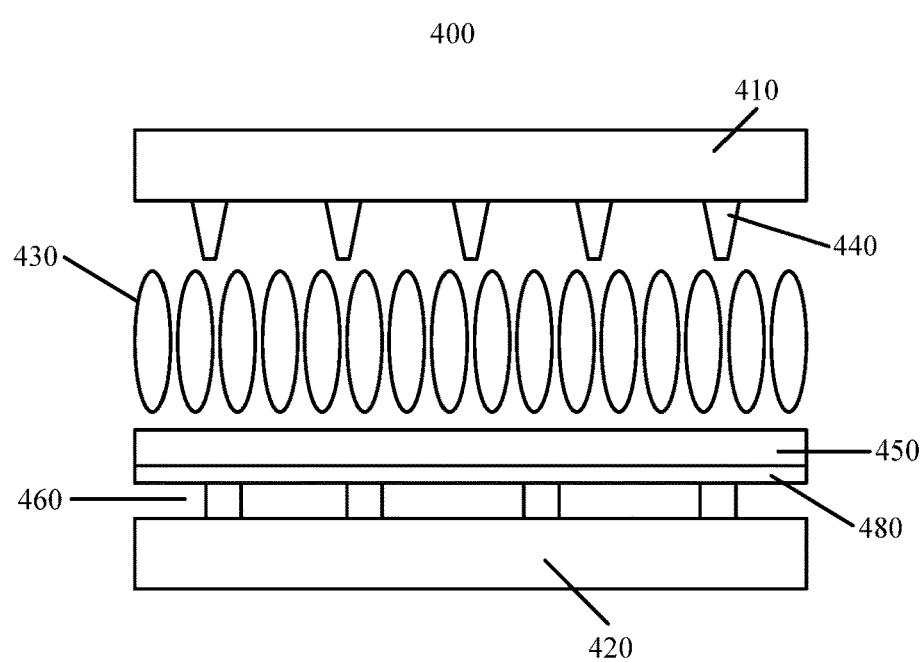
FIG. 4 is a schematic section view of an example of the touch panel according to an embodiment of this disclosure.

FIG. 4 is a schematic section view of an example of the touch panel according to an embodiment of this disclosure. In this example, the touch panel is a liquid crystal display (LCD) panel 400.

As shown in FIG. 4, the liquid crystal display panel 400 comprises a color film (CF) substrate 410 serving as the first substrate, and a thin film transistor (TFT) array substrate 420 opposite to the color film substrate 410 and serving as the second substrate, and a liquid crystal layer 430 sandwiched between the color film substrate 410 and the TFT array substrate 420. A plurality of magnetic protrusions 440 are arranged on the color film substrate 410, and a second coil group 460, an insulating layer 480 and a first coil group 450 are stacked sequentially on the TFT array substrate 420. One skilled in the art should appreciate that the first substrate can also be a TFT array substrate, and correspondingly the second substrate be a color film substrate.

In this example, the light-shielding region is implemented as a black matrix region. In this case, the magnetic protrusions 440 are arranged in the black matrix region between color filters of the color film substrate 410 and protrude towards the liquid crystal layer 430 from the color film substrate 410. The first coil group 450 and the second coil group 460 are arranged in the black matrix region between the pixel units of the TFT array substrate 420.

In an embodiment, the common electrode on the TFT array substrate 420 can be formed in a planar shape. In case that the common electrode is formed between the magnetic protrusions 440 and the first and second coil groups 450, 460, the common electrode may shield the magnetic field in the inductive sensor. In order to avoid influence by the common electrode on the magnetic field, a plurality of through holes can be provided by an etching process at positions in the common electrode corresponding to the magnetic protrusions 440 such that magnetic flux can pass through. Besides, by providing openings in the TFT array substrate 420, the movable displacement of the magnetic protrusions 440 can also be increased and thus the inductance can be increased. In addition, bumps between the magnetic protrusions 440 and the TFT array substrate 420 can be avoided.

Figure 5:
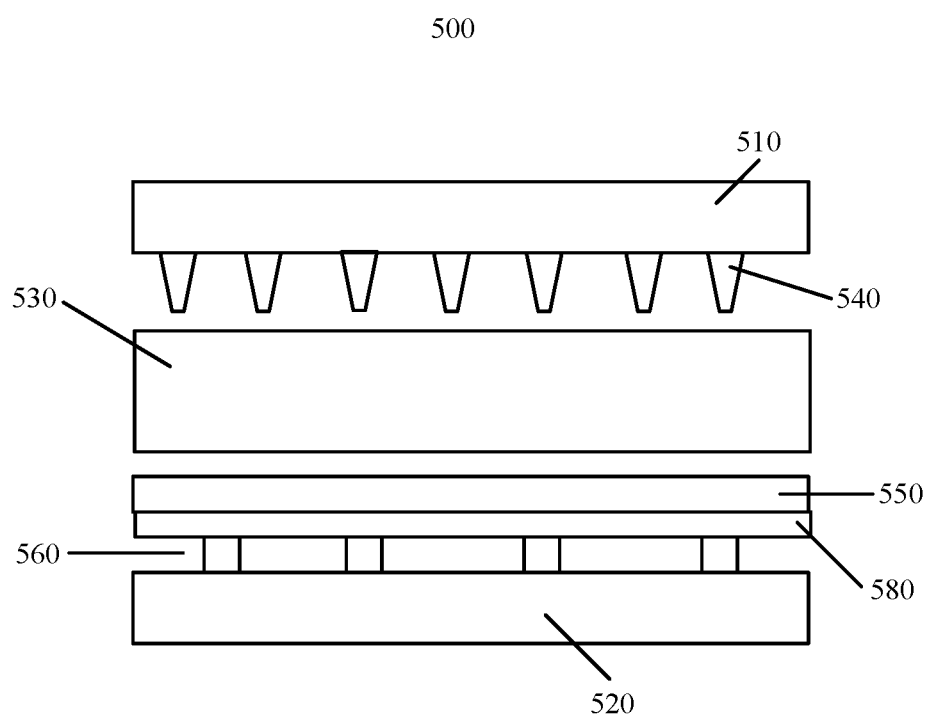
FIG. 5 is a schematic section view of another example of the touch panel according to an embodiment of this disclosure.

FIG. 5 shows a schematic section view of another example of the touch panel according to an embodiment of this disclosure. In this example, the touch panel is an organic light-emitting diode (OLED) display panel, for example, an active matrix organic light-emitting diode (AMOLED) display panel 500. As should be understood by one skilled in the art, other types of OLED display panels are also possible.

As shown in FIG. 5, the AMOLED display panel 500 comprises an encapsulation substrate 510 serving as the first substrate and an OLED array substrate 520 opposite to the encapsulation substrate 510 and serving as the second substrate. An organic light-emitting diode 530 is formed above the OLED array substrate 520. A plurality of magnetic protrusions 540 protruding towards the OLED array substrate 520 are arranged on the encapsulation substrate 510. A second coil group 560, an insulating layer 580 and a first coil group 550 are stacked sequentially on the OLED array substrate 520. One skilled in the art can appreciate that the first substrate can also be an OLED array substrate, and correspondingly the second substrate be an encapsulation substrate.

In this example, the light-shielding region is a gap region between the pixel units and can be implemented as a black matrix region. In this case, the magnetic protrusions 540 can be arranged in a region of the encapsulation substrate 510 corresponding to a gap region between pixel units of the OLED array substrate 520, and the first coil group 550 and the second coil group 560 can be arranged in a gap region between the pixel units of the OLED array substrate 520.

In the AMOLED display panel 500, the cathode of the organic light emitting diode 530 is typically formed in a planar shape. In case that the cathode of the organic light emitting diode is between the magnetic protrusions 540 and the first and second coil groups 550, 560, the cathode may shield magnetic fields in the inductive sensors, thereby influencing the accuracy of pressure sensing. Therefore, in an embodiment, the cathode of the organic light emitting diode 530 can be split in the gap region between the pixel units of the OLED array substrate 520, such that the magnetic flux can pass through the cathode.

Figure 6:
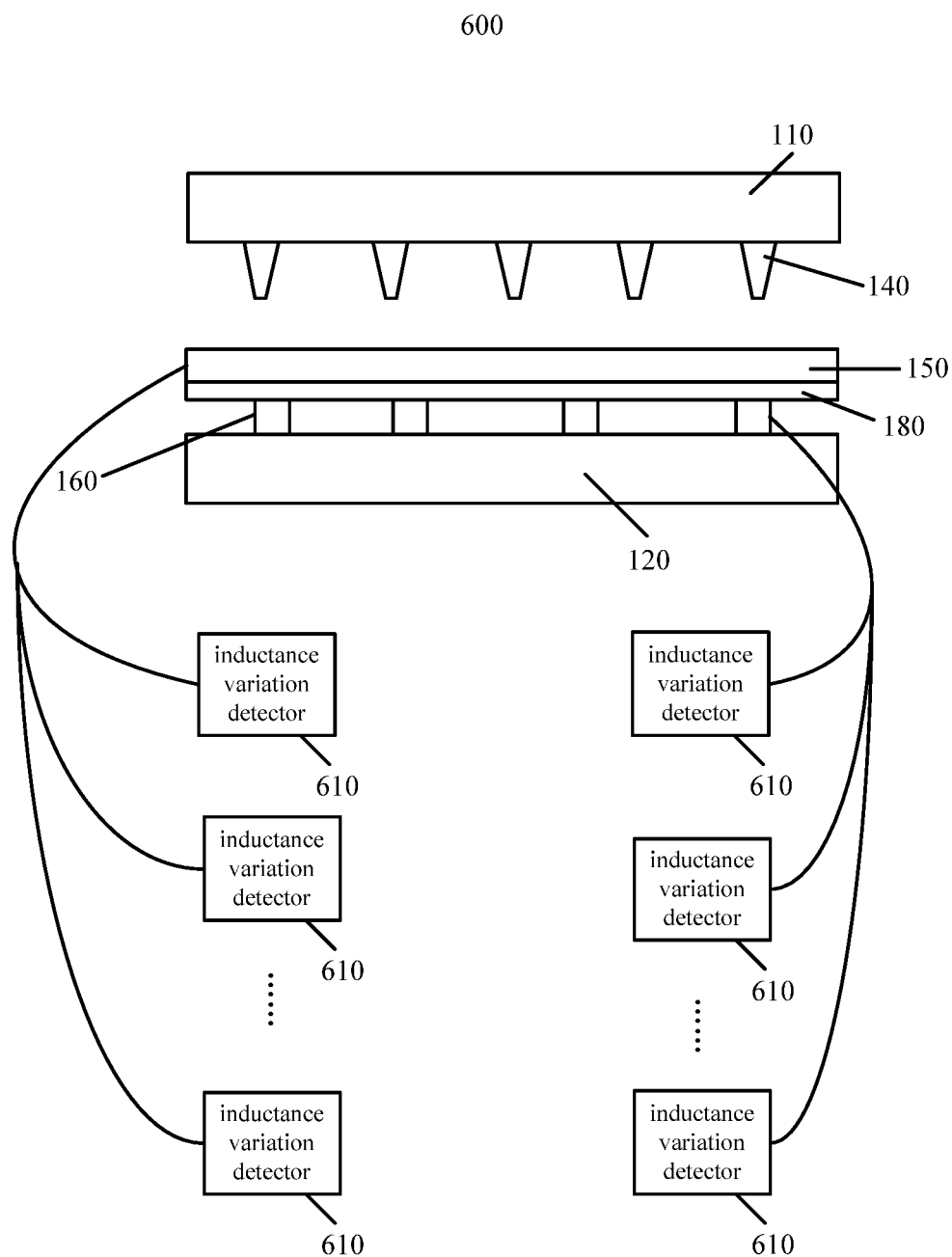
FIG. 6 is a schematic view of the touch panel according to a second embodiment of this disclosure.

FIG. 6 is a schematic view of the touch panel 600 according to a second embodiment of this disclosure, in which the elements the same as the above embodiments are indicated with the same reference signs. In this embodiment, in addition to a first substrate 110, a second substrate 120, magnetic protrusions 140, a first coil group 150 and a second coil group 160, the touch panel 200 further comprises a plurality of inductance variation detectors 610 for detecting inductance variations for the inductive sensors. Specifically, each inductance variation detector 610 is electrically connected with one coil in the first coil group 150 and the second coil group 160 so as to measure the inductance variation of an inductive sensor formed by the coil and the magnetic protrusions 140 surrounded thereby.

Figure 7:
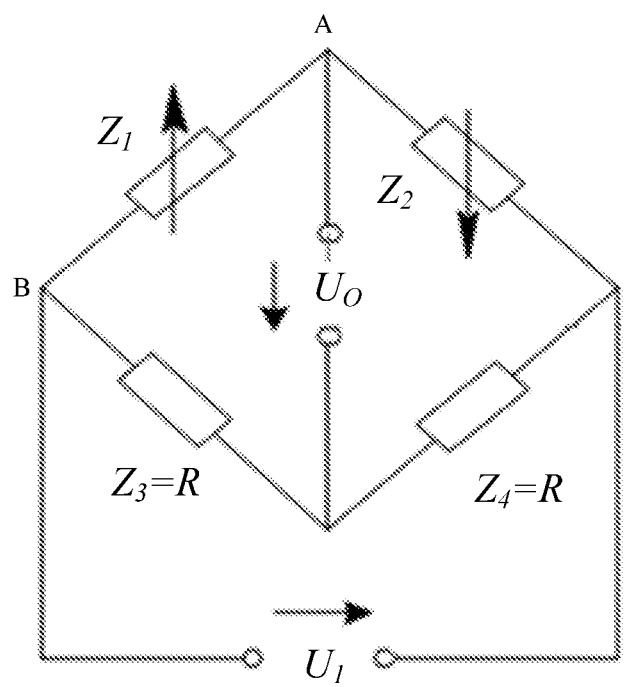
FIG. 7 is a circuit diagram of an example of the inductance variation detector in the touch panel of FIG. 6.

FIG. 7 shows a schematic view of an exemplary circuit of the inductance variation detector 610. As shown in FIG. 7, $Z_1$ indicates an inductive sensor of the touch panel 600. In a specific implementation, two ends of a coil can be respectively connected with point A and point B. In this circuit, $Z_2$ indicates a standard inductor having the same inductance as an initial inductance of $Z_1$, $U_1$ indicates an AC voltage, $Z_3$ and $Z_4$ indicate resistors having a same resistance value R. Therefore, voltage $U_O$ at an output terminal can be expressed by the following formula:

$$U_O = U_1 \cdot \left[\frac{Z_2}{Z_1 + Z_2} - \frac{R}{R+R}\right] = U_1 \cdot \frac{Z_2 - Z_1}{2(Z_1 + Z_2)} = -U_1 \cdot \frac{\Delta Z_1}{2(Z_1 + Z_2)}$$

As can be seen from the above formula, the output voltage $U_O$ is proportional to an inductance variation $\Delta Z_1$. Therefore, when the AC voltage $U_1$ is applied, if the inductance of $Z_1$ does not vary, the voltage $U_O$ is zero. If the inductance of $Z_1$ changes, a voltage will be generated at the output terminal. In this way, after a value of the output voltage is measured, inductance variations can be calculated according to the above formula.

Furthermore, upon detection of the inductance variations, a position of the coil connected with the inductance variation detector can be determined by means of the inductance variation detector 610. For example, the position can be represented as the arrangement position of the coil in the coil group to which they belong.

As can be seen from the above description, the touch panel 600 of this embodiment can detect the inductance variations of the inductive sensors caused by an external touch object's touching to the touch panel.

Figure 8:
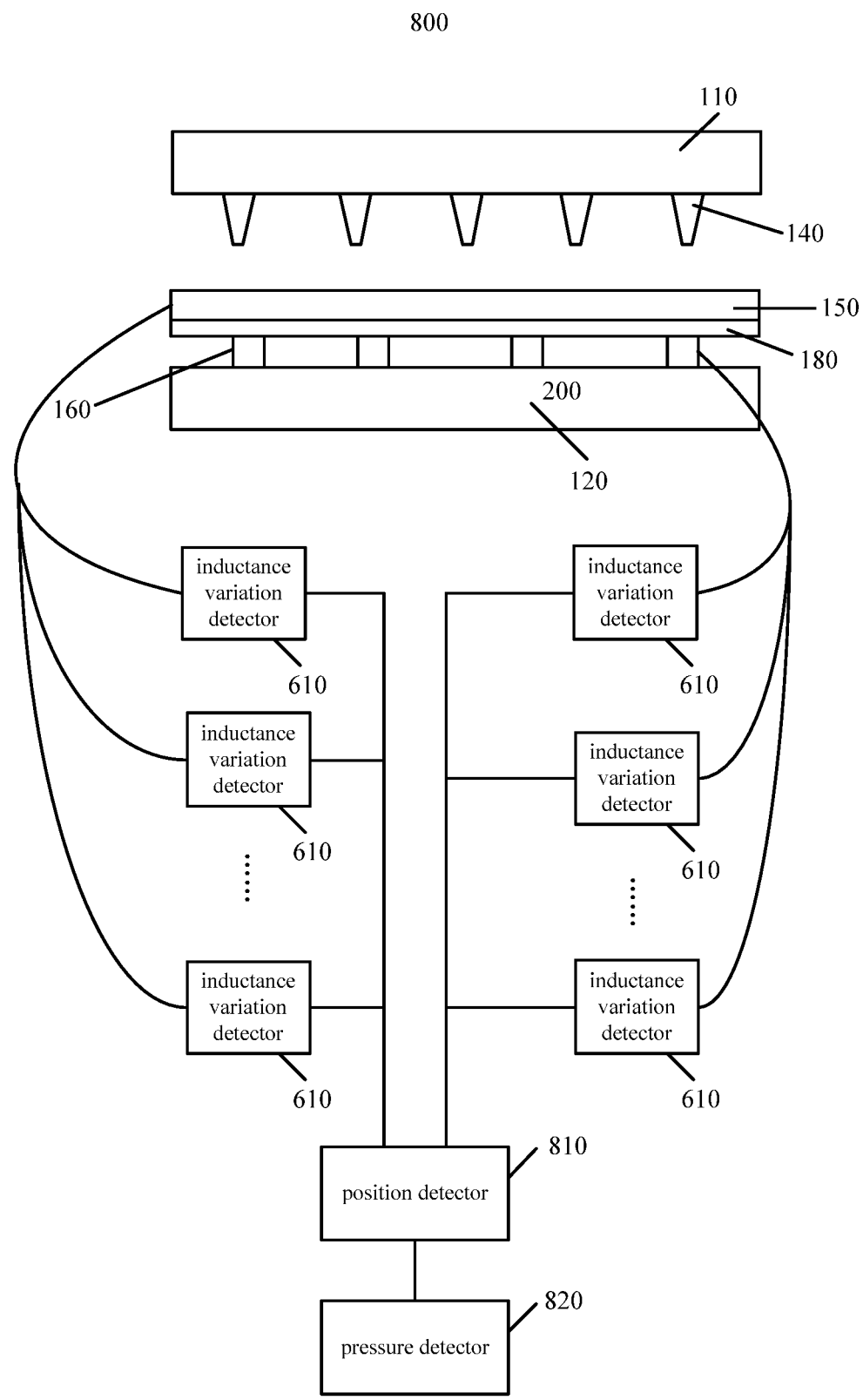
FIG. 8 is a schematic view of the touch panel according to a third embodiment of this disclosure.

FIG. 8 shows a schematic view of the touch panel 800 according to a third embodiment of this disclosure, in which the elements the same as the above embodiments are indicated with the same reference signs. Based on the touch panel 600 shown in FIG. 6, in this embodiment, the touch panel 800 further comprises a position detector 810 and a pressure detector 820.

The position detector 810 can receive position information of the coils from at least two inductance variation detectors 610, and determine a touch position of the touch object, e.g. a finger, based on the received position information. In an embodiment, a corresponding relationship between the position of each coil in the first coil group 150 and the second coil group 160 and the coordinate system of the screen of the touch panel 800 can be established in advance. For example, in case that the coils of the first coil group 150 extend in a horizontal direction and the coils of the second coil group 160 extend in a vertical direction, a corresponding relationship can be established between the arrangement positions of the coils of the first coil group 150 and the y coordinates of the screen, and a corresponding relationship can be established between the arrangement positions of the coils of the second coil group 160 and the x coordinates of the screen. In this way, the touch position can be determined based on the positions of the coils of the inductive sensors that generate the inductance variations.

Figure 9:
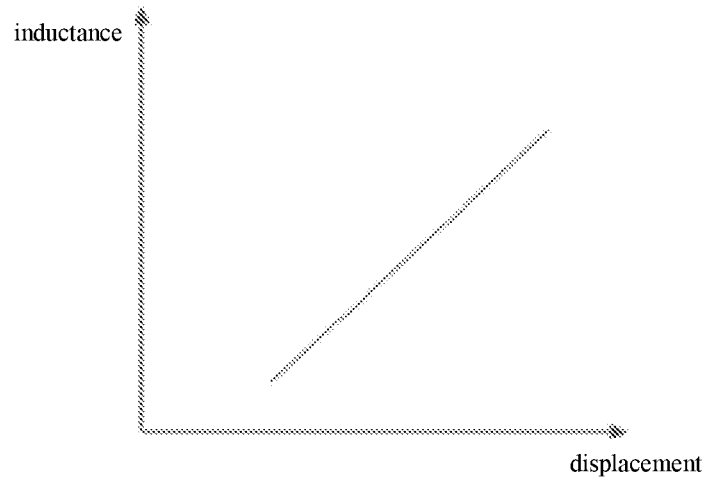
FIG. 9 is a graph showing the relationship between inductance and displacement.

The pressure detector 820 can receive the detected inductance variations from at least two inductance variation detectors 610 and process them to obtain a final inductance variation caused by the touch so as to determine the touch pressure value. In an embodiment, the maximum inductance variation can be chosen from the received inductance variations as the final inductance variation. In another embodiment, an average value of the received inductance variations can be calculated as the final inductance variation. Besides, it is proofed in experiment that, the inductance of the inductive sensor and the displacement of the magnetic protrusion thereof have a simple linear relationship as shown in FIG. 9. Hence, according to this linear relationship, the final inductance variation can be converted into a displacement value, e.g., a displacement of the magnetic protrusion caused by the finger's pressing (i.e., a variation in the distance between the coil and the magnetic protrusion). Then, according to the calculated variation in the distance, a pressure value of the finger's pressing can be obtained (i.e., the touch pressure value). In an embodiment, a table indicating the corresponding relationship between the touch pressure value and the variations in the distance can be pre-established. The touch pressure value can be determined by querying the table indicating this corresponding relationship.

A person having ordinary skills in the art should understand that the position detector 810 and the pressure detector 820 in this embodiment can be implemented by hardware, software or a combination thereof.

As can be seen from the above description, the touch panel 800 in this embodiment can determine the touch position of the external touch object and the magnitude of the touch pressure based on the detected inductance variations.

Figure 10:
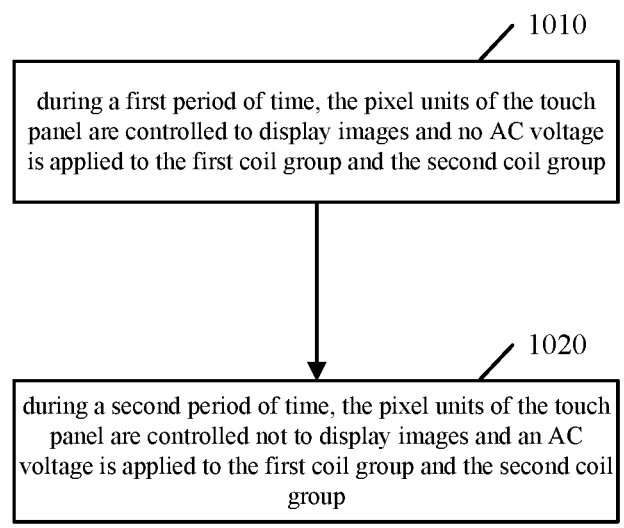
FIG. 10 is a schematic flow diagram of a driving method for driving the touch panel of FIG. 1, FIG. 6 or FIG. 8 according to an embodiment of this disclosure.

FIG. 10 shows a schematic flow chart of a driving method for driving the touch panel of FIG. 1, FIG. 6 or FIG. 8 according to an embodiment of this disclosure. As shown in FIG. 10, in step S1010, during a first period of time, the pixel units of the touch panel are controlled to display images and no AC voltage is applied to the first coil group and the second coil group. Therefore, during the first period of time, the touch panel is in a display mode. At this point, since the inductive sensor will not generate inductance, pressure touch control will not occur even if the touch panel is pressed. In an embodiment, the first period of time comprises at least one scanning period.

In step S1020, during a second period of time, the pixel units of the touch panel are controlled not to display images and an AC voltage is applied to the first coil group and the second coil group. Therefore, during the second period of time, the touch panel is in a touch mode. At this point, if the touch panel is pressed, the inductive sensors will generate inductance variations to achieve pressure touch control.

In case of the touch panel 600 as shown in FIG. 6, during the second period of time, inductance variations of a plurality of inductive sensors in the touch panel 600 can be further detected by the inductance variation detectors 610. Furthermore, the inductance variation detectors 610 can further determine positions of coils of at least two inductive sensors connected with the inductance variation detectors responsive to the detection of the inductance variations of the at least two inductive sensors.

In case of the touch panel 800 as shown in FIG. 8, after the inductance variation detectors 610 detect the inductance variations and determine the positions of the coils, the position detector 810 determine a touch position of a touch object causing the inductance variations based on the determined positions of the coils, and the pressure detector 820 calculates variations in the distance between the coils and corresponding magnetic protrusions based on the detected inductance variations, and further determine a touch pressure value based on the variations in distance. In an embodiment, by querying a pre-established table indicating the corresponding relationship between the touch pressure value and the variations in distance, a touch pressure value corresponding to the calculated variations in the distance can be obtained.

Further, an embodiment of the disclosure provides a display device comprising the touch panel as shown in FIG. 1, FIG. 6 or FIG. 8. The display device can be an electronic device such as a touch screen, a mobile phone, a smart phone, a laptop computer, a tablet computer, a digital camera, an electronic reader, a wearable device and a television.

Several embodiments of this disclosure are described above in detail, but obviously, those skilled in the art can make various modifications and variations to the embodiments of this disclosure without departing from the spirits and scopes of the invention. The protection scope of the invention is defined by the appended claims.

The invention claimed is:

1. A touch panel, comprising:
    a first substrate;
    a second substrate opposite to the first substrate;
    a plurality of magnetic protrusions arranged on the first substrate and protruding towards the second substrate;
    a first coil group comprising a plurality of coils extending in a first direction; and
    a second coil group comprising a plurality of coils extending in a second direction;
    wherein the first coil group and the second coil group are stacked above the second substrate and insulated from each other,
    wherein the coils in the first and second coil group and corresponding magnetic protrusions constitute a plurality of inductive sensors, the inductive sensors being capable of generating inductance variations responsive to variations in distances between the coils and the corresponding magnetic protrusions.

2. The touch panel according to claim 1, wherein the plurality of magnetic protrusions are arranged in a light-shielding region of the first substrate, and the first coil group and the second coil group are arranged in a light-shielding region of the second substrate.

3. The touch panel according to claim 2, wherein the plurality of magnetic protrusions are made of an opaque magnetic material.

4. The touch panel according to claim 1, wherein the first direction is perpendicular to the second direction.

5. The touch panel according to claim 1, wherein orthographic projections of at least one of the plurality of magnetic protrusions onto the second substrate are within each coil of the first coil group and the second coil group.

6. The touch panel according to claim 1, wherein each coil of the first coil group and the second coil group surrounds one or more pixel units.

7. The touch panel according to claim 1, wherein an overlapping region of each coil of the first coil group and each coil of the second coil group surrounds one or more pixel units.

8. The touch panel according to claim 1, wherein orthographic projections of at least one of the plurality of magnetic protrusions onto the second substrate are within an overlapping region of each coil of the first coil group and each coil of the second coil group.

9. The touch panel according to claim 1, further comprising:
    a plurality of inductance variation detectors connected with the coils of the first coil group and the second coil group respectively and configured to detect the inductance variations of the plurality of inductive sensors.

10. The touch panel according to claim 9, wherein each inductance variation detector is further configured to determine a position of a coil connected therewith upon detection of the inductance variations.

11. The touch panel according to claim 10, further comprising:
    a position detector configured to determine a touch position of a touch object causing the inductance variations based on the position of the coil received from the inductance variation detector; and
    a pressure detector configured to calculate variations in the distances based on the inductance variations received from the inductance variation detectors, and determine a touch pressure value based on the variations in the distances.

12. The touch panel according to claim 1, wherein the plurality of magnetic protrusions are made of a transparent magnetic material, wherein the plurality of magnetic protrusions are arranged in a display region of the first substrate.

13. The touch panel according to claim 1, wherein the touch panel is a liquid crystal display panel, wherein the first substrate is a color film substrate, and the second substrate is a thin film transistor array substrate, wherein the plurality of magnetic protrusions are arranged in a black matrix region between color filters of the color film substrate, and the first coil group and the second coil group are arranged in a black matrix region between pixel units of the thin film transistor array substrate.

14. The touch panel according to claim 13, wherein a plurality of through holes are arranged in a common electrode of the thin film transistor array substrate at positions corresponding to the plurality of magnetic protrusions.

15. The touch panel according to claim 1, wherein the touch panel is an organic light-emitting diode display panel, wherein the first substrate is an encapsulation substrate, and the second substrate is an OLED array substrate, wherein the plurality of magnetic protrusions are arranged in a region of the encapsulation substrate corresponding to a gap region between pixel units of the OLED array substrate, and the first coil group and the second coil group are arranged in the gap region between the pixel units of the OLED array substrate.

16. The touch panel according to claim 15, wherein a cathode of the organic light-emitting diode is split in the gap region between the pixel units of the OLED array substrate.

17. A method for driving the touch panel according to claim 1, comprising:
during a first period of time, controlling pixel units of the touch panel to display images and applying no AC voltage to the first coil group and the second coil group; and
during a second period of time, controlling the pixel units not to display images and applying an AC voltage to the first coil group and the second coil group.

18. The method according to claim 17, further comprising:
during the second period of time, detecting inductance variations of the plurality of inductive sensors in the touch panel;
detecting positions of coils of at least two inductive sensors responsive to the detection of inductance variations of the at least two inductive sensors,
determining a touch position of a touch object causing the inductance variations based on the positions of the coils, and
calculating variations in the distances between the coils and the corresponding magnetic protrusions based on the inductance variations, and determining a touch pressure value based on the variations in the distances.

19. The method according to claim 18, wherein determining a touch pressure value based on the variations in the distances comprises: querying a pre-established table indicating a corresponding relationship between the touch pressure value and the variations in the distances, so as to obtain touch pressure values corresponding to the calculated variations in distances.

20. A display device comprising the touch panel according to claim 1.

* * * * *